(12) United States Patent
Jokinen et al.

(10) Patent No.: US 7,230,724 B2
(45) Date of Patent: Jun. 12, 2007

(54) THREE-DIMENSIONAL MEASURING APPARATUS FOR SCANNING AN OBJECT AND A MEASUREMENT HEAD OF A THREE-DIMENSIONAL MEASURING APPARATUS AND METHOD OF USING THE SAME

(75) Inventors: Hannu Ensio Jokinen, Oulunsalo (FI); Stefan Kirchhoff, Dortmund (DE); Christoph Carlhoff, Willich (DE)

(73) Assignee: Specialty Minerals (Michigan) Inc., Bingham Farms, MI (US)

( * ) Notice: Subject to any disclaimer, the term of this patent is extended or adjusted under 35 U.S.C. 154(b) by 173 days.

(21) Appl. No.: 11/107,249

(22) Filed: Apr. 15, 2005

(65) Prior Publication Data

US 2006/0232786 A1 Oct. 19, 2006

(51) Int. Cl.
*G01B 11/24* (2006.01)
*G01N 21/86* (2006.01)

(52) U.S. Cl. .................. 356/608; 356/3.09; 356/141.4; 250/599.22; 250/201.2

(58) Field of Classification Search .. 356/141.1–141.5, 356/607–608, 612, 629, 639, 601–602, 3.09, 356/3.01; 250/559.22, 201.2, 216
See application file for complete search history.

(56) References Cited

U.S. PATENT DOCUMENTS

| 4,895,440 | A | | 1/1990 | Cain et al. | |
|---|---|---|---|---|---|
| 5,137,354 | A | | 8/1992 | De Vos et al. | |
| 5,546,217 | A | * | 8/1996 | Greenway | 359/223 |
| 5,880,828 | A | * | 3/1999 | Nakamura et al. | 356/237.3 |
| 6,560,024 | B2 | * | 5/2003 | Akiyama et al. | 359/619 |
| 6,989,890 | B2 | * | 1/2006 | Riegl et al. | 356/5.01 |
| 2004/0021852 | A1 | * | 2/2004 | DeFlumere | 356/141.1 |

FOREIGN PATENT DOCUMENTS

| DE | P 27 16 810 | 10/1977 |
|---|---|---|
| DE | 40 04 627 | 2/1991 |
| DE | 41 18518 | 10/1992 |
| WO | WO 2004/068211 | 8/2004 |

OTHER PUBLICATIONS

*Spectrochimica Acta*, vol. 27B, pp. 295-300, 1972.
Bates, Charles; *Hybrid CMM Makes Multiple Sense*, American Machinist, Jun. 2003.

* cited by examiner

*Primary Examiner*—Sang H. Nguyen
(74) *Attorney, Agent, or Firm*—Leon Nigohosian, Jr.; Derek S. Jessen; George H. Fairchild

(57) ABSTRACT

An improved three-dimensional (3D) measuring apparatus for scanning an object and a measurement head of a measuring apparatus and a method for using the measuring apparatus for scanning an object.

18 Claims, 6 Drawing Sheets

THREE-DIMENSIONAL MEASURING APPARATUS FOR SCANNING AN OBJECT AND A MEASUREMENT HEAD OF A THREE-DIMENSIONAL MEASURING APPARATUS AND METHOD OF USING THE SAME

BACKGROUND OF THE INVENTION

The invention relates to measuring of three-dimensional (3D) properties.

A distance measuring apparatus can be a range finder based on a time-of-flight principle, e.g. using a pulsed laser beam. A laser of the measuring apparatus having a suitable optical arrangement transmits an optical beam towards a desired object. The optical beam is reflected from the object to a receiver or detector that has a suitable optical arrangement for receiving. The duration for the optical beam to travel from the measuring apparatus to the object and back can be measured and the measured result can be transformed into distance on the basis of the speed of light.

One use of distance measurement is to measure the wear of the linings of metallurgical vessels, including, but not limited to, converter or ladle linings. In this context, knowledge of the thickness of the refractory lining—also called "remaining refractory thickness"—permits effective utilization of the refractory lining up to the wear limit without an increased risk of blow-out of the metallic jacket of the metallurgical vessel. Additionally, being able to measure the wear of these linings makes it possible to optimize the service life of the vessel and to prevent excessive wear.

Linings of converters must be renewed relatively often, as their life time varies from a week to several months, depending on what is melted, the material of which the lining is made, and the number of melts for which the vessel is used.

By deflecting (scanning) the laser beam in two directions one can determine the measured distance and polar co-ordinate angles of each point where the optical beam hits the object's surface, e.g. a vessel's inner surface. These measured points define the wear profile of the lining, which may be output for instance to a display terminal, by which the wear profile measured from a metallurgical vessel in use can be compared graphically and numerically with the profile that was measured of the inner surface of the same vessel during the modelling step before the vessel was actually brought into use, i.e. before the first melt.

DESCRIPTION OF RELATED ART

Some examples of related art are disclosed in documents WO 2004/068211, US 2002/0143506 and US 2003/0043386. However, the location, interrelation and direction of components in the related art is such that related technology is not able to fulfill the needs regarding the compatibility to detrimental conditions, regarding the scanning range and regarding the size of the apparatus and the size of the measurement head.

SUMMARY OF THE INVENTION

An object of the invention is to provide an improved three-dimensional (3D) measuring apparatus for scanning an object and a measurement head of a measuring apparatus and a method for using the measuring apparatus for scanning an object.

According to an aspect of the invention, there is provided a 3D measuring apparatus for scanning an object wherein the apparatus comprises a measurement head, the apparatus being configured to transmit an optical beam towards an object in a transmission direction (TD) through the measurement head, and to receive an optical beam reflected from the object in a reception direction (RD) through the measurement head. The measurement head comprises a support of the measurement head, a rotatable part of the measurement head where the rotatable part of the measurement head is rotatable around a first axis in relation to the support of the measurement head.

The apparatus comprises a first rotating means for rotating the rotatable part of the measurement head around the first axis in relation to the support of the measurement head. In the rotatable part of the measurement head a reflective guiding arrangement comprises at least one reflecting means, the reflective guiding arrangement being configured to receive an optical beam and to guide the optical beam further in the transmission direction (TD).

The reflective guiding arrangement can be configured to include any number of reflecting means for guiding the optical beam through the pathway. Alternatively, an optical fiber arrangement may be used in place of using a reflective guiding arrangement.

The reflective guiding arrangement is in a substantially fixed location within the rotatable part of the measurement head. In the rotatable part of the measurement head a rotatable reflecting means configured to receive optical beam from the reflective guiding arrangement the rotatable reflecting means being configured to be tilted in relation to a second axis and configured to forward the optical beam towards the object, the rotational position of the rotatable reflecting means being configured to define the position of the deflection path of the optical beam on the surface of the object, the deflection path being formed as the rotatable part of the measurement is rotated around the first axis. In the rotatable part of the measurement head means for rotating the rotatable reflecting means in relation to the second axis, the second axis being in perpendicular relation with respect to the first axis. The measurement head being configured in such a way that in the rotatable part of the measurement head the reflective guiding arrangement is configured to receive the optical beam in a direction that is co-axial with the first axis, and the measurement head being further configured in such a way that the rotatable reflecting means is configured to receive the optical beam from the reflective guiding arrangement in a direction that is co-axial with the second axis. The apparatus also comprises an optical source for creating the optical beam to be transmitted through the measurement head in the transmission direction (TD), a stop detector for receiving the optical beam through the measurement head in the reception direction (RD). Additionally, the distance measurement electronics or control unit of the apparatus may be such that the optical source, the detectors and control units are located in the apparatus elsewhere than in the rotating part of the measurement head.

The optical source, detectors, and control unit can be located in the support or can be physically separated from the measurement head. The optical connection between these elements and the measurement head can be accomplished by an optical fiber or through a direct optical beam including the transmitted and received beams.

According to another aspect of the invention, there is provided a measurement head for a 3D measuring apparatus, the measurement head being configured to forward an optical beam towards an object in a transmission direction (TD) through the measurement head and to receive an optical beam reflected from the object in a reception direction (RD) through the measurement head. The measurement head comprises a support of the measurement head and a rotatable part of the measurement head. The rotatable part of the measurement head being rotatable around a first axis in relation to the support of the measurement head. The measurement head comprises a first rotating means for rotating the rotatable part of the measurement head around the first axis in relation to the support of measurement head. In the rotatable part of the measurement head a reflective guiding arrangements comprises at least one reflecting means, the reflective guiding arrangement are configured to receive an optical beam and to guide the optical beam further in the transmission direction (TD), the reflective guiding arrangements are in a substantially fixed location within the rotatable part of the measurement head. In the rotatable part of the measurement head a rotatable reflecting means is configured to receive an optical beam from the reflective guiding arrangements. The rotatable reflecting means can be tilted in relation to a second axis and configured to pass the optical beam towards the object. The rotational position of the rotatable reflecting means is configured to define the position of the deflection path of the optical beam on the surface of the object, the deflection path being formed as the rotatable part of the measurement head is rotated around the first axis. In the rotatable part of the measurement head means for rotating the rotatable reflecting means in relation to the second axis, the second axis being in perpendicular relation with respect to the first axis. The measurement head is configured in such a way that in the rotatable part of the measurement head the reflective guiding arrangements is configured to receive the optical beam in a direction that is co-axial with the first axis. The measurement head can be further configured in such a way that the rotatable reflecting means is configured to receive the optical beam from the reflective guiding arrangements in a direction that is co-axial with the second axis.

A further objective of the invention is to provide a method for scanning an object using a measuring apparatus.

Additionally, the invention provides several advantages. Because the Thermo sensitive components, i.e. electronics and optics, are not within the rotating part of the measuring head, they can be kept outside of the vessel where they are isolated from the worst ambient conditions. The scanning range can be optimized to be very large. The physical size of the measurement head can be kept small thereby making it possible to measure small objects or small details of objects. There is no need to connect optical cables to the rotating part of the measurement head and therefore the protection and insulation of the measurement head can be achieved.

BRIEF DESCRIPTION OF THE FIGURES

In the following, the invention will be described in greater detail with reference to the embodiments and the accompanying drawings, in which.

DETAILED DESCRIPTION OF THE INVENTION

Figure 1:
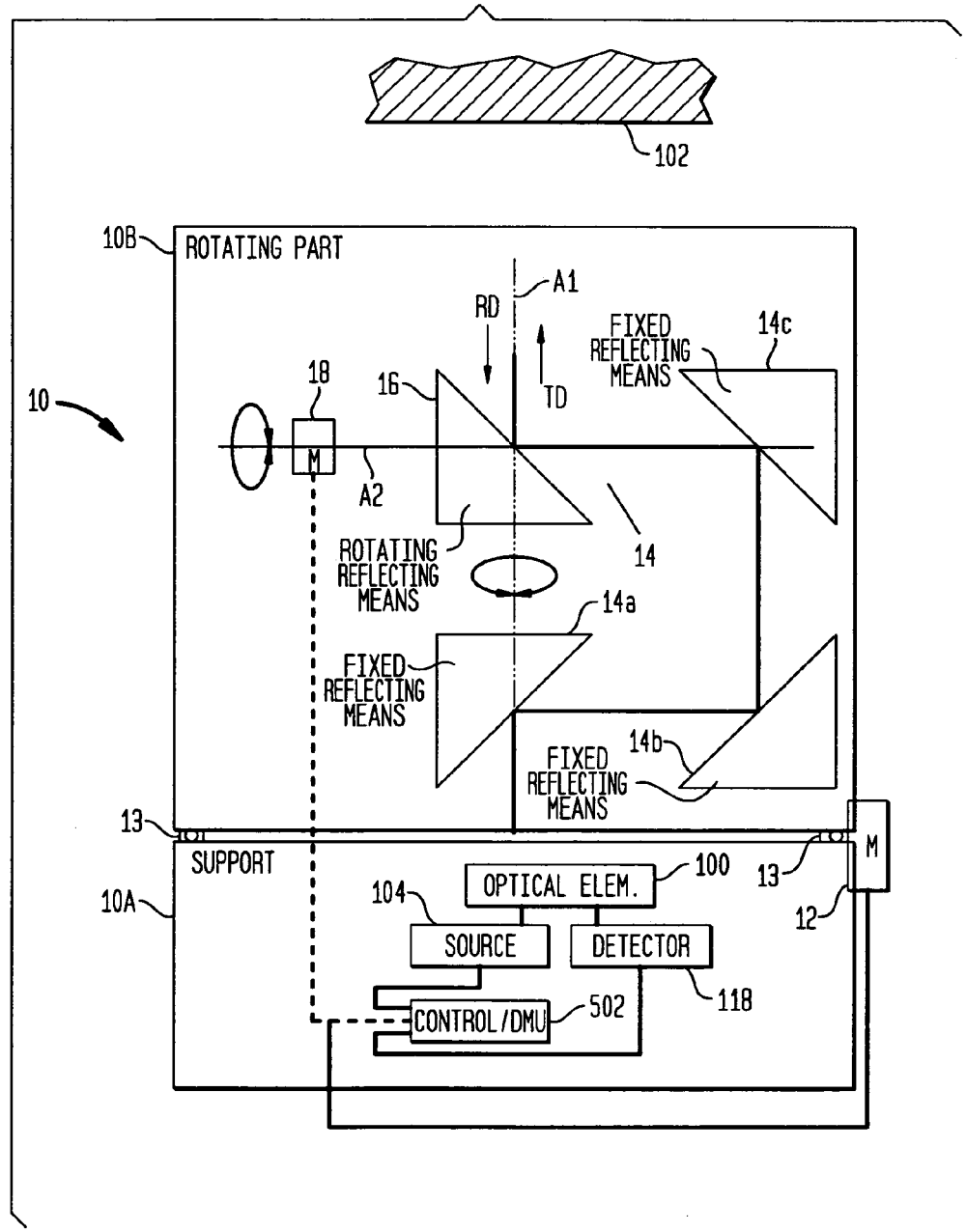
FIG. 1 shows a block diagram of the measuring apparatus relating to one embodiment of the invention.
Figure 2:
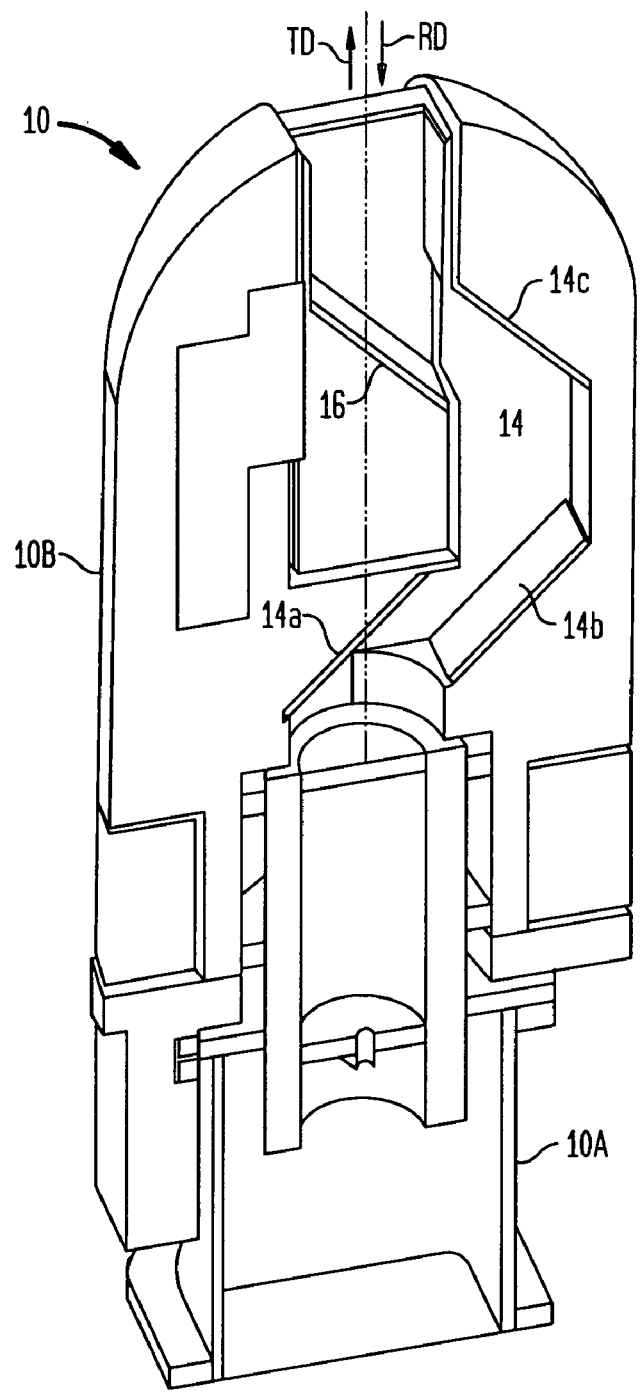
FIG. 2 illustrates internal structures of the measurement head of the measuring apparatus according to the above embodiment of the invention.

With reference to FIG. 1 and FIG. 2, a three-dimensional measuring apparatus for scanning an object 102 is shown. The apparatus comprises a measurement head 10 (including a support 10A and a rotatable part 10B), an optical source 104 for creating the optical beam to be transmitted through the measurement head 10 in the transmission direction (TD), a stop detector 118 for receiving the optical beam through the measurement head 10 in the reception direction (RD) and also a distance measurement unit for controlling the operation of the apparatus and for calculating the distance being measured.

The apparatus is configured to transmit an optical beam towards an object 102 in a transmission direction (TD) through a measurement head 10, and to receive an optical beam reflected from the object 102 in a reception direction (RD) through the measurement head 10.

The apparatus may also comprise an optical element 100, the role of the optical element 100 being to separate the optical beam of the reception direction (RD) from the optical beam of the transmission direction (TD). The purpose of optical element 100 is to direct the returning signal to the stop detector 118, not back to the optical source 104.

Figure 5:
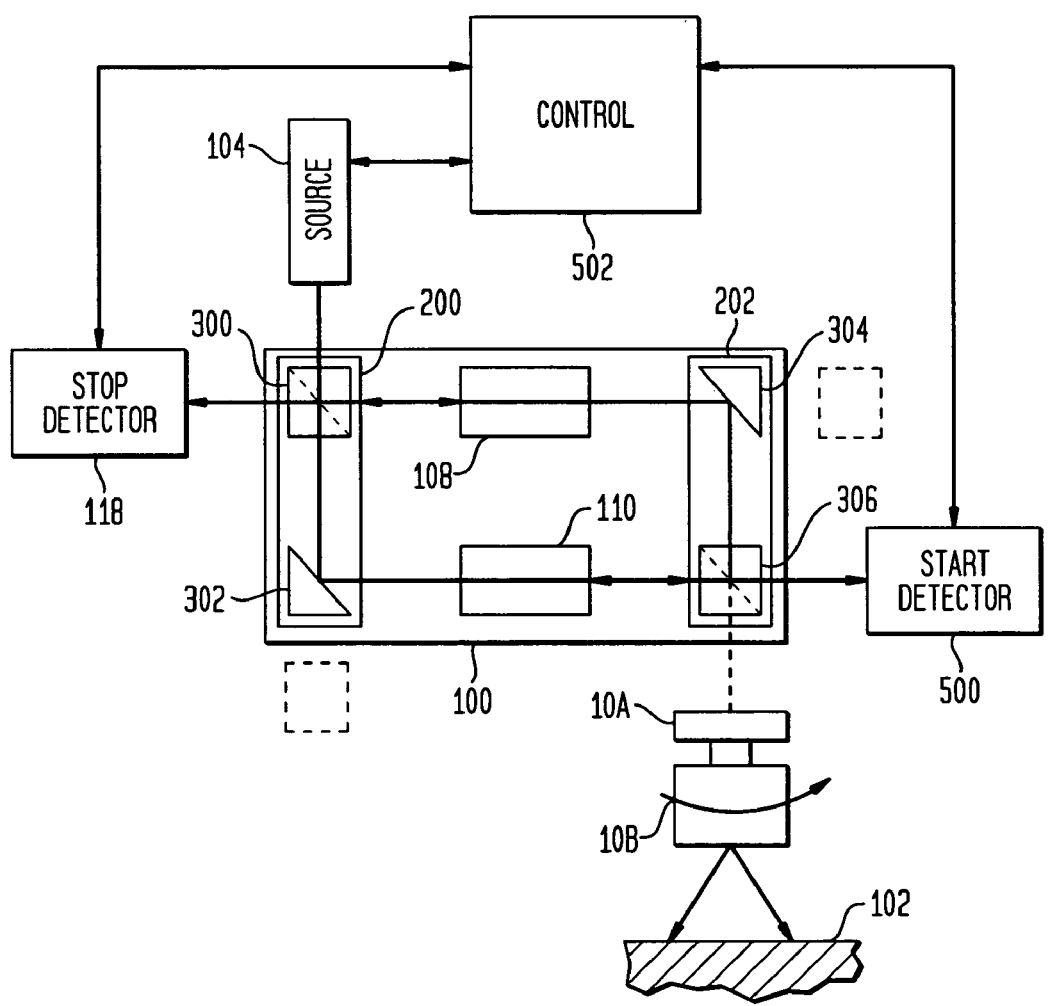
FIG. 5 illustrates a measuring apparatus.
Figure 6:
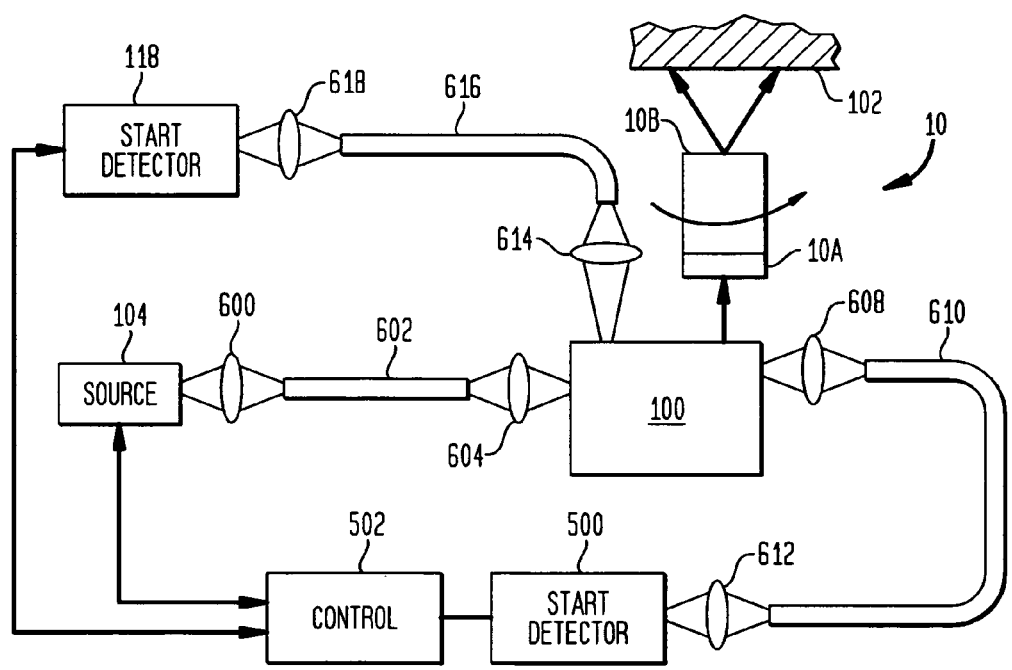
FIG. 6 illustrates a measuring apparatus with optical fibers.

The operation of the optical element 100 is shown in FIG. 5 and FIG. 6. If an optical element 100 is employed, then the apparatus is configured to transmit an optical beam towards an object 102 in a transmission direction (TD). The optical beam passes through the optical element 100 and measurement head 10, located after the optical element 100, and receives the optical beam reflected from the object 102 in a reception direction (RD). The optical beam passes through the measurement head 10 and the mentioned optical element 100 located after the measurement head 10. In the transmission direction the measurement head 10 is after the optical element 100 but in the reception direction (RD) the optical element 100 is after the measurement head 10.

In the present application, the optical beam refers to electromagnetic radiation at a wavelength band including, but not limited to, about several hundred nanometers. The transmission direction (TD) means a direction from an optical source 104 to the object 102 and the reception direction (RD) means a direction from the object 102 to a stop detector 118. The optical source 104 may transmit the optical beam as optical pulses.

The measurement head 10 comprises a support 10A and a rotatable part 10B. The rotatable part 10B of the measurement head 10 is rotatable around a first axis A1 in relation to the support 10A of measurement head 10. Therefore the role of the support 10A is to provide a base in relation to which the rotating part 10B of the measurement head 10 can be rotated around the first axis A1.

Figure 4:
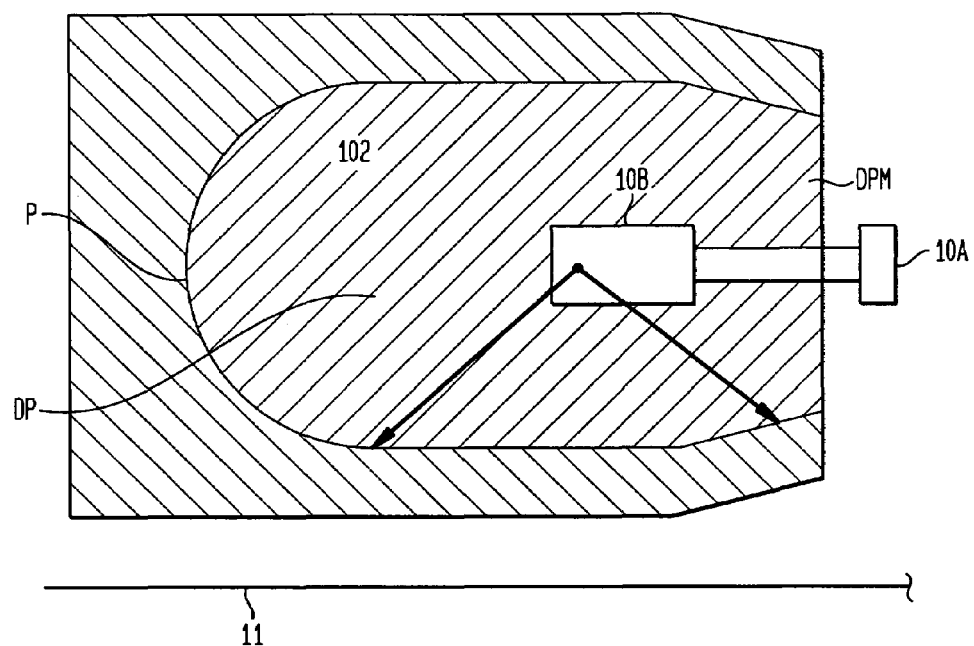
FIG. 4 illustrates looking in the direction of the longitudinal axis of the vessel, the deflection path of the optical beam on the surface of the vessel.

FIG. 4 illustrates wherein the rotatable part 10B can also be connected to support 10A via a shaft or some other means, allowing the support to be distanced from the rotatable part 10B. This enables the support 10A to be placed in a safe environment, e.g. outside a hot vessel.

Generally, the apparatus comprises a first rotating means 12 for rotating the rotatable part 10B of the measurement head 10 around the first axis A1 in relation to the support 10A of measurement head 10. The first axis A1 does not have to be a physical axis and can be a centerline axis of the rotation of the rotating part 10B of the measurement head 10. The first rotating means 12 for rotating the rotatable part 10B of the measurement head 10 can be a motor, such as an electric motor. A bearing 13 or some other suitable structure can be between the support 10A and the rotatable part 10B of the measurement head 10 in order to make the rotation of the rotatable part 10B possible. The first rotating means 12 is fixed to the support 10A and rotating axle of the rotating means 12 and is arranged to rotate the rotatable part 10B of the measurement head 10 from the outer surface of the rotatable part 10B of the measurement head 10. However, there are also several other possibilities for delivering the rotational power to the rotatable part 10B of the measurement head 10, e.g. separation of rotatable part 10B from support 10A via a rotatable shaft.

In the rotatable part 10B of the measurement head 10 there is a reflective guiding arrangement 14 comprising at least one reflecting means. However, it is envisioned that the reflective guiding arrangement can be configured to include any number of reflecting means for guiding the optical beam through the pathway. Alternatively, an optical fiber arrangement may be used in place of the reflective guiding arrangement.

The reflective guiding arrangement 14 is configured to receive the optical beam and to guide the optical beam further in the transmission direction. In practice, the reflective guiding arrangement 14 is arranged to guide the optical beam to a rotatable reflecting means 16. Therefore, the rotatable part 10B of the measurement head 10 comprises a rotatable reflecting means 16 configured to receive the optical beam from the reflective guiding arrangement 14. The rotatable reflecting means 16 can be tilted in relation to a second axis A2 and the optical beam is projected towards the object 102.

The rotatable reflecting means 16 is a component of the rotatable part 10B of the measurement head 10 and therefore the rotatable reflecting means 16 belongs to the rotatable part 10B of the measurement head 10. In other words, the rotatable part 10B of the measurement head 10 comprises the rotatable reflecting means 16. The rotation of the rotatable part 10B occurs in relation to the first axis A1 and the rotation power comes from the first rotating means 12, whereas the rotation of the rotatable reflecting means 16 occurs in relation to the second axis A2 and the rotation power comes from a second rotating means 18. Additionally, the rotatable reflecting means 16 is subjected to the rotation around the first axis A1 because the rotatable reflecting means 16 belongs to the rotatable part 10B of the measurement head 10 that is rotatable around the first axis with the power from the first rotation means 12.

In FIG. 4, the rotational position of the rotatable part 10B around the first axis A1 and the rotational position of the reflecting means 16 in relation to the second axis A2 define the deflection path (DP) of the optical beam on the surface of the object. Simultaneous rotation around the two axes enables measurement of the whole inner surface of the vessel In FIG. 1 the position of the rotatable reflecting means 16 is in a zero-set position. This means that despite the rotation of the rotatable part 10B, there will not be any deflection path onto the surface of the object because the optical beam forms only a rotating spot P but not any circular or spiral or any other deflection path. In a situation where the rotatable reflecting means 16 is set to some other position by rotating the rotatable reflecting means 16 at least some degrees in relation to the second axis A2, the rotation of the rotating part 10B of the measurement head 10 starts creating a rotating path instead of just a spot P rotating around itself.

Referring to FIG. 1, when the rotatable reflecting means 16 is tilted during the rotation of the rotating part 10B of the measurement head 10, the scanning operation is optimized. This can be achieved by a control unit 502 arranged to tilt the reflecting means 16 at the same time the rotatable part 10B of the measurement head 10 is rotated.

Another version (not shown) would be a rotatable reflecting means tilted in relation to the second axis A2, but then stopped at a certain position before the rotation of the rotatable part 10B of the measurement head 10 is started, and after a full 360 degree rotation of the rotatable part 10B of the measurement head 10, the rotation of the rotatable part 10B of the measurement head 10 is stopped and the rotatable reflecting means 16 is set to a different rotational position in relation to the second axis A2. Then the rotation of the rotatable part 10B of the measurement head 10 is resumed. In this version the rotation of the rotatable part 10B would create co-centric circles, one circle for each rotational position of the stepwise rotated rotatable reflecting means 16.

The rotatable reflecting means 16 does not necessarily have to be rotated around and around, and it is not necessary to have one full 360 degrees rotation, rather it is enough that the rotatable reflecting means 16 can be tilted/inclined/rotated in relation to the second axis A2 in such a manner that the optical beam is able to reach the whole area needing to be measured. With a rotatable planar reflecting means 16 as disclosed in FIG. 1, a suitable amount of rotation of the rotatable reflecting means 16 in relation to the second axis A2 is needed in order to reach the vicinity of the mouth area of the vessel. This is due to the mouth area being located behind the measurement head 10 when the measurement head is immersed into the vessel as can be seen in FIG. 4.

In the present invention, the rotation of the rotatable part 10B of the measurement head 10 can be continuous when using slip rings for transferring power from the support 10A to the second rotating means 18 located in the rotatable part 10B. Therefore, the movement of the rotatable part 10B does not have to be a back and forth movement. The rotation of the rotatable reflecting means 16 can also be continuous.

The apparatus is such that in the rotatable part 10B of the measurement head 10 the measurement head comprises a second rotating means 18 for rotating the rotatable reflecting means 16 in relation to the second axis A2, the second axis A2 being in perpendicular relation with respect to the first axis A1. This feature of mutual perpendicular relation between axis A1 and axis A2 maximizes the scanning range.

Figure 3:
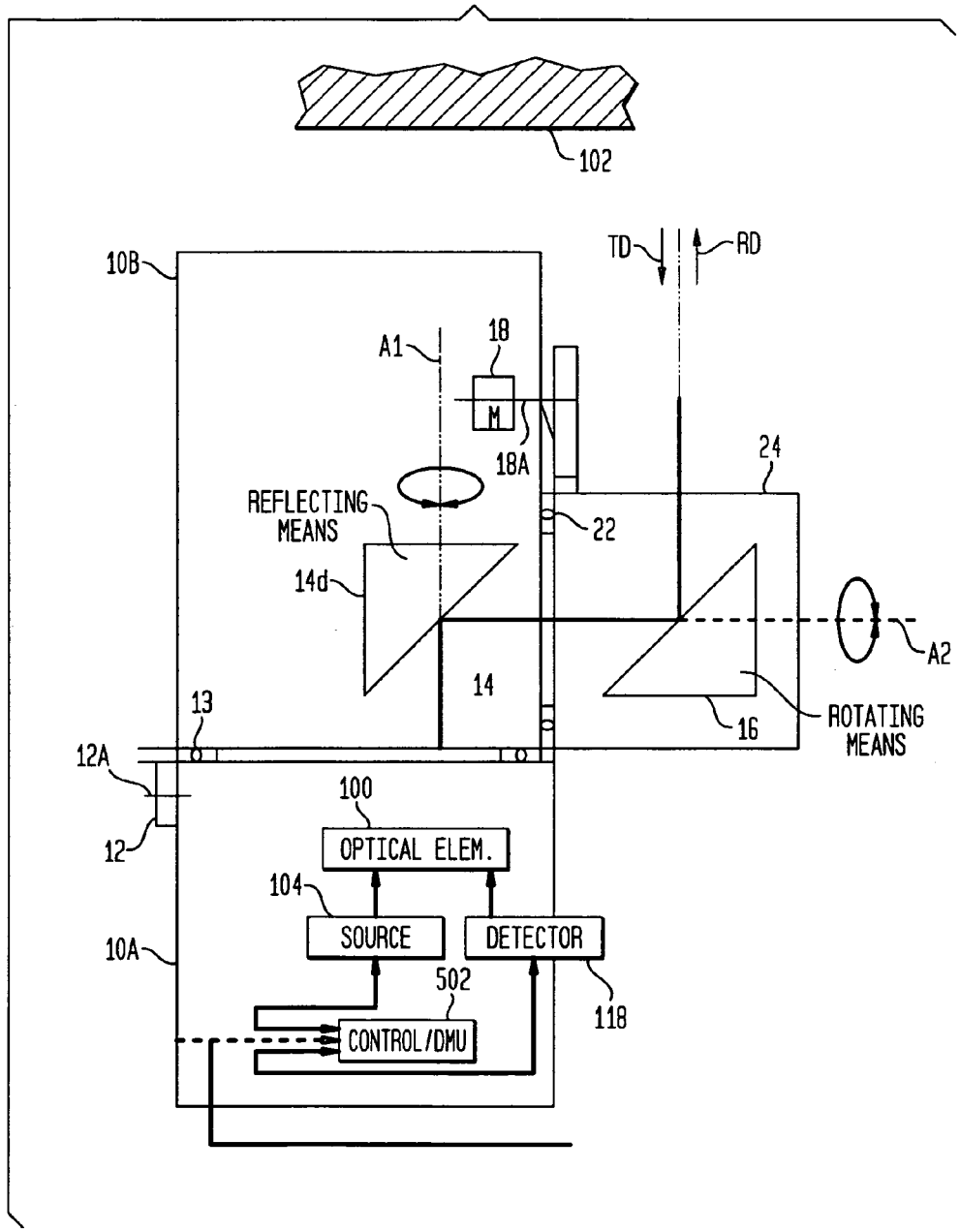
FIG. 3 illustrates the measurement head of the measuring apparatus according to another embodiment of the invention.

In FIG. 3, a bearing 22 or some other suitable component can be used in order to make the rotation of the rotatable reflecting means 16 possible in relation to the rotatable part 10B. A second rotating means 18 is fixed to the body of the rotatable part 10B and a rotating axle of the second rotating means 18 is arranged to rotate the casing section 24 of the rotatable reflecting means 16 from the outer surface of the casing section 24. However, there are also several other possibilities for delivering the rotational power to the rotatable reflecting means 16. Additionally, the rotatable reflecting means 16 can be an element having a planar mirror.

The reflective guiding arrangement 14 is in a substantially fixed location within the rotatable part 10B of the measurement head 10, whereas the rotatable reflecting means 16 is, as the name of the component refers, rotatable in relation to the body of the rotatable part 10B and at the same time in relation to the second axis A2.

The main difference between the embodiment shown in FIGS. 1 and 2 and the embodiment shown in FIG. 3 is the structure of the reflective guiding arrangement 14. In FIG. 1 and FIG. 2 the reflective guiding arrangement 14 comprises three reflecting means, that is a first, a second and a third reflecting means 14a, 14b, 14c, whereas in FIG. 3 the reflective guiding arrangement 14 comprises one reflecting means 14d.

FIG. 1 and FIG. 2 illustrate an arrangement wherein a first reflecting means 14a is arranged to receive the optical beam and which tilts the optical beam in a direction perpendicular to the first axis A1. Additionally, a second reflecting means 14b can be arranged to receive the optical beam from the first reflecting means 14a and to tilt the optical beam in a direction parallel with the first axis. Additionally, the third reflecting means can be arranged to receive the optical beam from the second reflecting means and to tilt the optical beam in a direction coaxial with the second axis towards the rotatable reflecting means 16. Alternatively, an optical fiber may be used instead of the reflective guiding arrangement 14, to guide the optical beam to the reflecting means 16.

Because of the perpendicular rotation, the above mentioned embodiment employs a 90-degree angle between the reflecting means 14a and 14b, and also between reflecting means 14b and 14c. This makes it easier to align the components and allows for adjustment and calibration of the co-ordinate system of the measurement unit.

The reflecting means 14a–14c of FIG. 1 and 14d of FIG. 3 can be planar mirrors or prisms.

Thermosensitive components, i.e. optical source 104, detectors, control unit 502, and the optical element 100, can be in the support 10A of the measurement head 10 as is disclosed in FIG. 1.

Alternatively, the thermosensitive components can be even further away from the rotating part 10B of the measurement head. This can mean the thermosensitive components are not within either part of the measurement head 10A or 10B, but instead located further away. If configured in this way, there is an optical path including, but not limited to, an optocable or optical fibers, creating distance between the measurement head 10 and the thermosensitive components such as the optical source 104, detectors, control unit 502, and optical element 100.

The measurement head 10 is configured in such a way that in the rotatable part 10B of the measurement head 10 the reflective guiding arrangement 14, 14a–14c in FIG. 1 and FIG. 2, or alternatively 14 and 14d in FIG. 3 receives the optical beam in a direction that is co-axial with the first axis A1. This feature makes it possible to keep the thermosensitive components elsewhere than in the rotating part 10B of the measurement head 10.

The measurement head 10 can also be configured in such a way that the rotatable reflecting means 16 receives the optical beam from the reflective guiding arrangement 14 in a direction that is co-axial with the second axis A2.

The apparatus is such that the optical source 104, the detectors, and the control unit 502, are located in the apparatus elsewhere than in the rotating part 10B of the measurement head 10.

Referring to FIG. 3 the reflective guiding arrangement 14 comprises a reflecting means 14d wherein the optical beam is received and guided to a rotatable reflecting means 16 situated on the axis A2.

FIGS. 1–3 illustrates the rotatable reflecting means 16 is tilted at substantially a 45 degree angle in relation to the second axis A2.

The reflective guiding arrangement 14 can be tilted in substantially a 45 degree angle in relation to the first axis A1, regarding the receiving of the optical beam to the reflecting means 14a in FIG. 1 or to reflecting means 14d in FIG. 3. Therefore, in FIG. 1 the reflecting means 14a is at substantially a 45 degree angle in relation to first axis A1, and in FIG. 3 the reflecting means 14d is at substantially a 45 degree angle in relation to first axis A1.

An optical element 100 may be included in the apparatus. The role of the optical element 100 is to separate the optical beam of the reception direction (RD) from the optical beam of the transmission direction (TD). The purpose of optical element 100 is to direct the returning signal to the stop detector 118 and not back to the optical source 104.

FIG. 5 and FIG. 6 illustrate that the optical element 100 can be considered non-reciprocal, which means that the operation of the optical element 100 depends on the optical beam's propagation direction through the optical element 100. The propagation-direction-dependent operation can be achieved by at least two non-reciprocal components 108 and 110, which may include, for example, a Faraday rotator and a quarter wave plate. Additionally, the measuring apparatus may include a variety of other optical components including, but not limited to, filters, lenses, mirrors, and fibers.

Referring to FIG. 5, the first polarization transformer 200 may include a first polarizing beam splitter 300 and a first mirror 302, and the second polarization transformer 202 may include a second polarizing beam splitter 304 and a second mirror 306.

In case a laser source or some other source producing a polarized beam is used as a optical source 104, the element 110, consisting of a Faraday rotator and quarter wave plate, of the lower branch of the optical element 100, would not be needed.

FIG. 5 illustrates a measuring apparatus based on a time-of-flight principle. The optical beam may be transmitted from an optical source 104 to the entrance aperture in the transmission direction in the optical element 100. The optical source 104 may be a monochromatic optical source including, but not limited to, a laser, a narrow band optical source such as a LED (Light Emitting Diode) or a wideband optical source including, but not limited to, a glow lamp, an incandescent lamp, a halogen lamp and the like. The optical beam may travel through the optical element 100 up to a second polarization transformer 202, which may penetrate a fraction of the optical beam such that the fraction passes to a start detector 500. The fraction of the optical beam may be due to imperfections in the second transformer and in polarization. Hence, there is no need to construct the second polarization transformer 202, such that it penetrates a certain part of the optical beam although that may also be done.

The start detector 500 detects the fraction which may vary from some percentage to a billionth part (or smaller) in power of the beam entering the entrance aperture, and feeds a corresponding electrical signal to a control unit 502 which forms a start mark $t_1$, of the optical beam. The start mark $t_1$ defines the moment relating to the departure of the optical beam from the optical element 100. Instead of the position relating to the polarizing beam splitter in the second polarization transformer 202, the start detector 500 may be placed beside mirrors of either polarization transformers 200, 202 (the detectors drawn with a dashed line).

The majority of the optical beam is transmitted to the object 102, which reflects a part of the optical beam back to the optical element 100. The optical element 100 passes the received optical beam to a stop detector 118.

The measuring apparatus can be used to measure hot surfaces and objects with high absorption properties without restriction due to not having to attach reflectors; i.e. the object 102 may be a hot steel-processing vessel such as a ladle or a converter. The present solution is not, however, restricted to these. The stop detector 118 detects the received optical beam and feeds a corresponding electrical signal to a control unit 502 which forms a stop mark $t_2$ for the pulse of the received optical beam. The stop mark $t_2$ defines the moment relating to the arrival of the optical beam to the measuring apparatus. The control unit 502 may determine timing difference $\Delta t = t_2 - t_1$ of the start mark and the stop mark and the control unit 502 may determine the distance D between the object 102 and the measuring apparatus as a function of the timing difference, $D = f(\Delta t)$. In a simple model the dependence between the distance D and the timing difference $\Delta t$ is linear, i.e. $D = c\Delta t$, where c is a constant. In the case of the object 102 being a hot steel processing vessel, the changes in the thickness of the wall of the vessel can be measured as the wall wears, which can be observed through increases in distance.

FIG. 6 represents a measuring apparatus utilizing optical fibers. The optical beam from the optical source 104 may be focused in a transmitting fiber 602 by a first optical unit 600. The optical beam leaving the transmitting fiber 602 may be focused to the entrance aperture of the optical element 100 by a second optical unit 604. The optical beam transmitted from the optical element 100 is directed to the measurement head 10 and via the rotating part 10B of the measurement head 10 towards the object 102. The optical beam penetrating towards the start detector 500 may be focused to a start fiber 610 by a third optical unit 608. The start pulse propagating out of the start fiber 610 may be focused to the start detector 500 by a fourth optical unit 612. The received optical beam may be focused to a receiving fiber 616 by a fifth optical unit 614. Finally, the received optical beam leaving the receiving fiber 616 may be focused to the stop detector 118 by a sixth optical unit 618.

In order to forward the reflected signal from the object 102 to the stop detector 118 the measurement head 10 is arranged to receive the signal from the object to the rotatable reflecting means 16 and from there to the stop detector 118 via the reflective guiding arrangement 14, consisting of 14ac, 14b, 14c, regarding FIG. 1 or alternatively via reflective guiding arrangement 14, consisting of 14d, regarding FIG. 3, possibly via optical element 100 if that is included in the system between the rotating part 10B of the measurement head 10 and the stop detector 118. Additionally, an optical fiber may be used in place of the reflective guiding arrangement 14a, 14b, 14c of FIG. 1 and 14d of FIG. 3, for forwarding the signal.

Even though the invention is described above with reference to examples according to the accompanying drawings, it is clear that the invention is not restricted thereto but can be modified in several ways within the scope of the appended claims.

The invention claimed is:

1. A measurement head for a three-dimensional measuring apparatus, the measurement head being configured to forward an optical beam towards an object in a transmission direction through the measurement head, and to receive an optical beam reflected from the object in a reception direction through the measurement head, wherein the measurement head comprises:

a support of the measurement head and a rotatable part of the measurement head, wherein the rotatable part of the measurement head being rotatable around first axis in relation to the support of the measurement head and the measurement head comprising a first rotating means for rotating the rotatable part of the measurement head around the first axis in relation to the support of measurement head;

in the rotatable part of the measurement head having a reflective guiding arrangement comprising at least one reflecting means, wherein the reflective guiding arrangement being configured to receive optical beam and to guide the optical beam further in the transmission direction and the reflective guiding arrangement being in a substantially fixed location within the rotatable part of the measurement head;

in the rotatable part of the measurement head having a rotatable reflecting means configured to receive optical beam from the reflective guiding arrangement, wherein said rotatable reflecting means being configured to be tilted in relation to a second axis and configured to forward the optical beam towards the object, the rotational position of the rotatable reflecting means being configured to define the position of the deflection path of the optical beam on the surface of the object, and the deflection path being formed as the rotatable part of the measurement head is rotated around the first axis;

in the rotatable part of the measurement head having means for rotating the rotatable reflecting means in relation to the second axis, and said second axis being in perpendicular relation with respect to the first axis;

the measurement head being configured in such a way that in the rotatable part of the measurement head having the reflective guiding arrangement is configured to receive the optical beam in a direction that is co-axial with the first axis, and the measurement head being further configured in such a way that the rotatable reflecting means is configured to receive the optical beam from the reflective guiding arrangement in a direction that is co-axial with the second axis; and the apparatus comprising also an optical source for creating the optical beam to be transmitted through the measurement head in the transmission direction, a stop detector for receiving the optical beam through the measurement head in the reception direction and also a control unit, the apparatus being such that the optical source, the stop detector and control unit are located in the apparatus elsewhere than in the rotating part of the measurement head.

2. The apparatus of claim 1, wherein the rotatable reflecting means is in a substantially 45 degrees tilted position in relation to the second axis.

3. The apparatus of claim 1, wherein the reflective guiding arrangement is in a substantially 45 degrees tilted position in relation to the first axis.

4. The apparatus of claim 1, wherein the reflective guiding arrangement is substantially 45 degrees tilted in relation to the second axis.

5. The apparatus of claim 1, wherein the reflective guiding arrangement comprises a reflective surface and this reflective surface is configured to receive the optical beam and also to guide the optical beam to the rotatable reflecting means.

6. The apparatus of claim 1, wherein the reflective guiding arrangement comprises first, second and third reflecting means, and that the first reflecting means is arranged to receive the optical beam and to turn the optical beam to a direction perpendicular to the first axis, and that the second reflecting means is arranged to receive the optical beam from the first reflecting means and to turn the optical beam to a direction parallel with the first axis, and that the third reflecting means is arranged to receive the optical beam from the second reflecting means and to turn the optical beam to a direction coaxial with the second axis towards the rotatable reflecting means.

7. The apparatus of claim 1, wherein an optical fiber arrangement for guiding the optical beam towards the rotatable reflecting means is used instead of the reflective guiding arrangement.

8. The apparatus of claim 1, wherein the optical source, the detector(s) and the control unit are located in the apparatus elsewhere than in the measurement head.

9. The apparatus of claim 1, wherein the optical source, the detector(s) and control unit are located in the apparatus in the support of the measurement head in relation to which support the rotating part of the measurement head is rotatable.

10. The apparatus of claim 1, wherein the optical source, detector(s), and control unit are separate from the measurement head wherein the optical connection between these elements and the measurement head is through optical fiber.

11. The apparatus of claim 10, wherein the optical source, detector(s), and control unit are physically separated from the measurement head, wherein the optical connection between these elements and the measurement head is through a direct optical beam.

12. A measurement head for a three-dimensional measuring apparatus, the measurement head being configured to forward an optical beam towards an object in a transmission direction through the measurement head, and to receive an optical beam reflected from the object in a reception direction through the measurement head, wherein the measurement head comprises:
   a support of the measurement head and a rotatable part of the measurement head, wherein the rotatable part of the measurement head being rotatable around first axis in relation to the support of the measurement head and the measurement head comprising a first rotating means for rotating the rotatable part of the measurement head around the first axis in relation to the support of measurement head;
   in the rotatable part of the measurement head having a reflective guiding arrangement comprising at least one reflecting means, wherein the reflective guiding arrangement being configured to receive optical beam and to guide the optical beam further in the transmission direction and the reflective guiding arrangement being in a substantially fixed location within the rotatable part of the measurement head;
   in the rotatable part of the measurement head having a rotatable reflecting means configured to receive optical beam from the reflective guiding, wherein said rotatable reflecting means being configured to be tilted in relation to a second axis and configured to forward the optical beam towards the object, the rotational position of the rotatable reflecting means being configured to define the position of the deflection path of the optical beam on the surface of the object, and the deflection path being formed as the rotatable part of the measurement head is rotated around the first axis;
   in the rotatable part of the measurement head having means for rotating the rotatable reflecting means in relation to the second axis, said second axis being in perpendicular relation with respect to the first axis; and
   the measurement head being configured in such a way that in the rotatable part of the measurement head having the reflective guiding arrangement is configured to receive the optical beam in a direction that is co-axial with the first axis, and the measurement head being further configured in such a way that the rotatable reflecting means is configured to receive the optical beam from the reflective guiding arrangement in a direction that is co-axial with the second axis.

13. The measurement head of claim 12, wherein the rotatable reflecting means is in a substantially 45 degrees tilted position in relation to the second axis.

14. The measurement head of claim 12, wherein the reflective guiding arrangement is in a substantially 45 degrees tilted position in relation to the first axis.

15. The measurement head of claim 12, wherein the reflective guiding arrangement is substantially 45 degrees tilted in relation to the second axis.

16. The measurement head of claim 12, wherein the reflective guiding arrangement comprises a reflective surface and this reflective surface is configured to receive the optical beam and also to guide the optical beam to the rotatable reflecting means.

17. The measurement head of claim 12, wherein the reflective guiding arrangement comprises first, second and third reflecting means, and that the first reflecting means is arranged to receive the optical beam and to turn the optical beam to a direction perpendicular to the first axis, and that the second reflecting means is arranged to receive the optical beam from the first reflecting means and to turn the optical beam to a direction parallel with the first axis, and that the third reflecting means is arranged to receive the optical beam from the second reflecting means and to turn the optical beam to a direction coaxial with the second axis towards the rotatable reflecting means.

18. The measurement head of claim 12, wherein the measurement head comprises an optical source, detector(s), and control unit, and that the optical source, the detectors(s) and control unit are located in support of the measurement head or are protected by the support of the measurement head in relation to which support the rotating part of the measurement head is rotatable.

* * * * *